United States Patent Office 2,990,875
Patented July 4, 1961

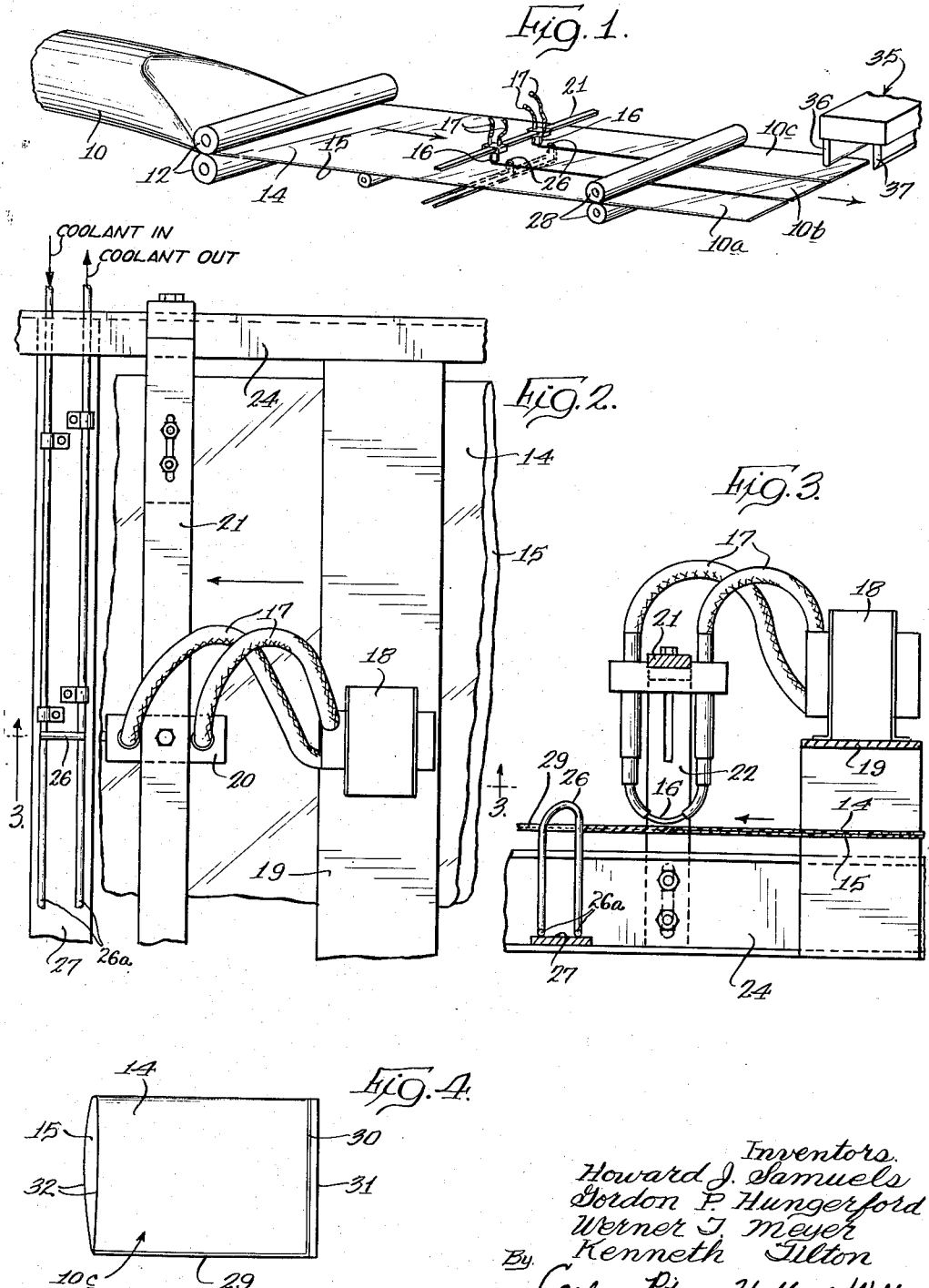

2,990,875
METHOD AND APPARATUS FOR FORMING TUBES OF THERMOPLASTIC FILM
Howard J. Samuels, Canandaigua, Gordon P. Hungerford, Pittsford, Werner T. Meyer, Rochester, and Kenneth Tilton, Palmyra, N.Y., assignors, by mesne assignments, to National Distillers and Chemical Corporation, a corporation of Virginia
Filed June 16, 1958, Ser. No. 742,383
11 Claims. (Cl. 154—42)

The present invention relates to the production of polyethylene tubing and more particularly to the production of a plurality of tubes from a single large diameter lay-flat tube of polyethylene.

One method of commercially producing thin films of polyethylene is to extrude the polymer through an annular die to form a tube and then expand the tube to many times its extruded diameter. This expansion is conveniently carried out by the use of an air bubble entrapped with the tubing between the extruder die and a pair of pinch rolls. The expanded tubing may be many feet in diameter and the resulting film may be thin and have a thickness in the order of 1 mil.

The tubing passes from the pinch rolls in the form of a flattened web and the product is commonly referred to as lay-flat tubing. It will be appreciated that the width of this web is large, being equal to one half the circumference of the expanded tube. Lay-flat tubing is a commercial bulk form of thin polyethylene film, and is further processed into various products such as bags, overwrap sheet material, and many others.

The use of polyethylene in the form of bags has received increasingly wide commercial acceptance. In present commercial practice, small bags are manufactured from single layer roll stock film by the back seam method, requiring many separate handling operations apart from the original film forming apparatus, thereby adversely affecting economical volume production of bags. The formation of small diameter tubing by extrusion has also been attempted, but again such processes have generally been held to be uneconomical when compared to the products of large diameter lay-flat tubing.

It is the primary object of the present invention to provide an improved method and apparatus for producing, from a wide web of flattened tubing or lay-flat tubing of heat fusible material such as polyethylene film, a multiplicity of strong, clean, relatively small diameter lay-flat tubes. More specifically, it is an object of the present invention to provide an improved method and apparatus for producing such small diameter tubes continuously as the polyethylene film comes from the pinch rolls of the extruder, which tubes are particularly, but not necessarily exclusively suited for the ultimate purpose of manufacturing bags and the like.

Another object of the present invention is to provide an improved method by which a plurality of small diameter lay-flat polyethylene tubes can be produced rapidly and economically from wide webs of lay-flat tubing. A further object of the present invention is to provide an improved apparatus with which a plurality of polyethylene tubes can be produced from a single large diameter tube of lay-flat tubing, which apparatus is easily adjustable for varying the diameter of the tubes, which produces air tight tubes, and which is extremely simple and economical in operation.

A further object of the present invention is to provide an improved method and apparatus for producing a plurality of thin walled polyethylene tubes having smooth, strong side seams of substantially improved appearance, and, more specifically, having side seams which are not frayed, which do not have ragged fringes, and which present a pleasing finished appearance. It is an object therefore to produce polyethylene tubes of enhanced consumer acceptability, which tubes can be made into bags possessing the foregoing desirable characteristics.

Other objects and advantages of the present invention will become apparent as the following description proceeds taken in connection with the accompanying drawings wherein:

FIGURE 1 is a perspective schematic view of an apparatus for carrying out the present invention.

FIG. 2 is a plan view of an apparatus illustrative of the present invention for slitting lay-flat polyethylene tubing.

FIG. 3 is an elevation view of the apparatus shown in FIG. 2.

FIG. 4 illustrates one form of bag which may be produced from one of the small diameter tubes shown in FIG. 1.

While a certain illustrative method and apparatus for producing polyethylene tubes has been shown in the drawings and will be described below in considerable detail, it should be understood that there is no intention to limit the invention to the specific form disclosed. On the contrary, the intention is to cover all modifications, alternative constructions, equivalents, and uses falling within the spirit and scope of the invention as expressed in the appended claims. While the invention has been described in connection with polyethylene tubing it should further be understood that the invention is applicable for use with any fusable and heat sealable thermoplastic material capable of being formed into thin walled tubes.

In the process of producing lay-flat polyethylene tubing, a tube 10 of polyethylene (FIG. 1) is extruded from a die (not shown) and expanded by the introduction of air to form an inflated bubble or tube. The desired quantity of air for expanding the tube is maintained by a pair of rotating pinch rolls 12 which also serve to collapse the tubing passing therebetween into a flat web-like material. This web comprises an upper layer 14 and a lower layer 15 positioned flat against each other and joined together at their edges. The amount of inflating air necessary to expand or inflate the tubing to the desired final diameter is introduced through the die and is confined in the bubble by the pinch rolls 12. The resulting web leaving the pinch rolls 12 is usually many feet in diameter and is what is commonly referred to as lay-flat tubing.

In accordance with the present invention, a plurality of tubes of relatively smaller diameter is formed from a web consisting of a single flattened large diameter lay-flat tube by the continuous fusing of the upper and lower layers 14, 15 at one or more points along the web and immediately following the fusing by separating the web into a plurality of smaller tubes. Sufficient heat is applied to the moving web at the desired points to fuse both the upper and lower layers 14, 15 together. Immediately following the fusing of the strips, the fused areas are separated to form a plurality of webs of lay-flat tubes, and simultaneous with this separation, the fused areas are cooled. This produces a plurality of flattened tubes having smooth, uniform side seams or welds produced by the fusing and severing of the strips. The area of fusion is very narrow and is determined by the effective width of the heating element employed. The side seam welds thus formed are uniform and without breaks or tears, and give a highly satisfactory and pleasing finished appearance to the tube and thus to products made from the tubes.

For carrying out the foregoing method there is provided in accordance with the present invention, an apparatus for fusing and subsequently separating and cooling the fused areas to produce a plurality of webs. One illustrative apparatus embodying the invention is shown in the drawings and comprises one or more electric resistance elements in the form of a loop 16, positioned closely adjacent the moving web for heating a narrow strip on the web to fuse the upper and lower layers 14 and 15. The loop is connected by means of leads 17 to a transformer 18 mounted on a bracket 19 above the web. When the loop is heated to a temperature sufficient to melt the thermoplastic layers, and is positioned above the travelling web, generally at a distance ranging from 0 to about 10 mils clearance, the layers of the web are fused together in a small area at that point. This area is lengthened due to the traveling web thereby forming a weld between two smaller diameter tubes. The loop is secured in an insulating block 20 and is secured to a bracket 21 adjustably mounted for transverse movement on a vertical bracket 22 which is in turn mounted for vertical movement on a frame 24.

Immediately following the resistance loop there is provided, for separating and cooling the fused weld area, a small water cooled tube 26 protruding through the fused portion of the web. This tube separates the molten strip into two parts and simultaneously cools the weld to provide a continuous side seam 29. One form of cooling element useful for this purpose comprises an upstanding loop formed by a small diameter copper tube connected to a copper manifold tube 26a adjustably mounted on a bracket 27 secured to the frame, the tube being connected to a source of cooling fluid such as water.

By making the resistance loops and cooling elements adjustable and providing more than one such combination, the web can be welded and cut into any desired number and width of separate tubes, three such tubes 10a, 10b, and 10c being shown in FIG. 1. These individual small diameter tubes are then drawn by appropriate rolls 28 and are directed to wind-up reels or to other processing apparatus.

The above described process of forming a plurality of small diameter tubes from a single large diameter tube in the form of a web of lay-flat tubing is particularly useful in connection with the subsequent formation of bags. Referring to FIG. 4, there is shown a bag formed from one of the small diameter tubes, 10c for example, by transversely sealing the tube 10c to form a transverse narrow sealing strip 30. The bag blank is then severed from the tube along cut lines 31, 32 on opposite sides of the strip 30 to form a bag. In such a bag, the bottom is defined by a narrow sealing strip 30, at least one side by the weld 29, and the other side by the junction of layers 14 and 15. It will be apparent to those skilled in the art that any suitable bag forming apparatus of the type using tubing as a source of bag material may be employed to form the transverse narrow sealing strip 30 and sever the bag from the tube. For example, a bag former indicated generally at 35 (FIG. 1) may include a hot element 36 for use in forming the bottom sealing strip and the bag blank may be subsequently severed from the tube along the cut lines 31 and 32 by an appropriate knife or knives 37.

The side seam or weld 29 on the tubes 10a, 10b and 10c, and thus on a bag formed therefrom (FIG. 4), is strong and smooth of appearance as well as free of ragged edges. The tubes and thus bags formed therefrom are of substantially superior appearance when compared to tubing and bags wherein the seal is made by a hot knife or other presently known commercial method. Furthermore, the above described method and apparatus is particularly well adapted for use with thin walled polyethylene film having a thickness of 8 mils or less. With the present invention, production of a plurality of tubing from the single large diameter tube is continuous and no moving parts are required to form the side seams.

We claim is our invention:

1. For use in forming a plurality of tubes of thin gauge polyethylene from a single large diameter continuous traveling tube flattened to form a web having upper and lower layers, a high temperature heating unit closely adjacent said web for fusing said layers together in a narrow weld area extending longitudinally along said traveling web, a water cooled cutting means spaced from said heating unit in the direction of travel of said web projecting through said weld area for separating said web into a plurality of webs and simultaneously for cooling said weld area thereby to produce a plurality of independent airtight tubes having smooth uniform side seams.

2. For use in forming a plurality of tubes of thin gauge polyethylene from a continuous traveling single large diameter tube flattened to form a web having upper and lower layers, means for fusing said layers together in a narrow weld area extending longitudinally along said web, means spaced from said fusing means in the direction of travel of said web for separating said web along said weld area into a plurality of webs, and means for simultaneously cooling said separating means and thereby said weld area so as to produce a plurality of independent airtight tubes having smooth uniform side seams.

3. For use in forming a plurality of tubes of thin gauge heat fusible polymeric material in the form of a single large diameter tube flattened to form a web having upper and lower layers, a high temperature heating wire closely adjacent said web for fusing said layers together in a narrow weld area extending longitudinally along said web, a cutting means projecting through said weld adjacent said heating wire for separating said web into a plurality of webs, and means for cooling said cutting means and thereby said weld to produce a plurality of independent airtight tubes of a diameter smaller than that of the large diameter tube.

4. Apparatus for continuously forming at least one thin walled tube of a heat fusible and heat sealable thermoplastic material such as polyethylene from a continuous traveling web having two layers adjacent and parallel to one another, comprising, in combination, means spaced from said web for fusing said layers together in at least one narrow weld area extending longitudinally of said web in the direction of travel, means spaced from said fusing means for separating said web along said weld area into at least two webs and for simultaneously cooling said separated weld thereby to produce at least one independent airtight tube.

5. Apparatus for continuously forming at least one thin walled tube of a heat fusible and heat sealable thermoplastic material such as polyethylene from a continuous traveling single large diameter tube flattened to form a web having two layers adjacent and parallel to one another, comprising, in combination, means spaced from said web for fusing said layers together in at least one narrow weld area extending longitudinally of said web in the direction of travel, means spaced from said fusing means for separating said web along said weld area into at least two webs and for simultaneously cooling said separated weld thereby to produce at least two independent airtight tubes.

6. Apparatus for continuously forming at least one thin walled tube of a heat fusible and heat sealable thermoplastic material such as polyethylene from a continuous traveling web having two layers adjacent and parallel to one another, comprising, in combination, a high temperature heating element spaced closely adjacent said web for fusing said layers together in at least one narrow weld area extending longitudinally of said web in the direction of travel, cutting means spaced from said fusing means in the direction of travel of said web and projecting through said weld area for separating said web along said weld area into at least two webs, and means for cooling said cutting means and thereby said separated weld area so as to produce at least one independent airtight tube.

7. Apparatus for continuously forming at least one thin walled tube of a heat fusible and heat sealable thermoplastic material such as polyethylene from a continuous traveling web of lay flat tubing collapsed to form two layers adjacent and parallel to one another, comprising, in combination, a plurality of high temperature heating elements adjustably mounted closely adjacent said web for fusing said layers together in a plurality of parallel narrow weld areas extending longitudinally of said web in the direction of travel, a plurality of cutting means spaced from respective ones of said fusing means for separating said web along said weld areas into a plurality of webs, and means for cooling said cutting means and thereby said weld areas so that a plurality of independent airtight tubes are produced from said single lay flat tube.

8. The method of continuously forming at least one thin walled tube of a heat fusible and heat sealable thermoplastic material such as polyethylene from a continuous traveling web of said material having two layers adjacent and parallel to one another, comprising the steps of continuously fusing said layers together in at least one narrow weld area extending longitudinally of the web in the direction of travel thereof, and substantially immediately thereafter separating said web at said weld area into at least two webs while simultaneously cooling the fused weld area thereby to produce at least one independent tube from said material.

9. The method of continuously forming at least one thin walled tube of a heat fusible and heat sealable thermoplastic material such as polyethylene from a continuous traveling single large diameter lay flat tube of said material flattened to form a web having two layers adjacent and parallel to one another, comprising the steps of continuously fusing said layers together in at least one narrow weld area extending longitudinally of the web in the direction of travel thereof, and substantially immediately thereafter separating said web at said weld area into at least two webs while simultaneously cooling the fused weld area, thereby to produce at least two independent lay flat tubes from said single lay flat tube.

10. The method of continuously forming at least one thin walled tube of a heat fusible and heat sealable thermoplastic material such as polyethylene from a continuous traveling web of said material having two layers adjacent and parallel to one another, comprising the steps of continuously fusing said layers together in a plurality of narrow weld areas extending longitudinally of the web in the direction of travel thereof, and substantially immediately thereafter separating said web at said weld areas into a plurality of webs while simultaneously cooling the fused weld areas thereby to produce a plurality of independent tubes from said material.

11. The method of continuously forming at least one thin walled tube of a heat fusible and heat sealable thermoplastic material such as polyethylene from a continuous traveling web of said material having two layers adjacent and parallel to one another, comprising the steps of continuously fusing said layers together in at least one narrow weld area extending longitudinally of the web in the direction of travel thereof, substantially immediately thereafter separating said web at said weld area into at least two webs while simultaneously cooling the fused weld area to produce at least one independent tube from said material, forming a transverse seam strip across at least one independent tube, and severing said tube on opposite sides of said transverse strip seam to form a bag.

References Cited in the file of this patent

UNITED STATES PATENTS

| | | |
|---|---|---|
| 2,185,647 | Penn | Jan. 2, 1940 |
| 2,289,618 | Young | July 14, 1942 |
| 2,326,931 | Dalton et al. | Aug. 17, 1943 |
| 2,469,972 | Lowry et al. | May 10, 1949 |
| 2,735,797 | Schjeldahl | Feb. 21, 1956 |
| 2,796,913 | Fener et al. | June 25, 1957 |
| 2,805,973 | Klasing et al. | Sept. 10, 1957 |